United States Patent [19]

Ibar

[11] Patent Number: 5,326,393

[45] Date of Patent: Jul. 5, 1994

[54] PROCESS FOR DETERMINING THE ACTUAL TEMPERATURE OF A MOLDABLE MATERIAL CONTAINED WITHIN A MOLD OR PASSED THROUGH A DIE

[75] Inventor: Jean-Pierre Ibar, New Canaan, Conn.

[73] Assignee: Solomat Partners, L.P., Stamford, Conn.

[21] Appl. No.: 26,953

[22] Filed: Mar. 5, 1993

Related U.S. Application Data

[63] Continuation-in-part of Ser. No. 882,754, May 11, 1992, abandoned, and a continuation-in-part of Ser. No. 903,062, Jun. 22, 1992, Pat. No. 5,271,876, which is a continuation-in-part of Ser. No. 663,988, Feb. 4, 1991, abandoned, which is a continuation-in-part of Ser. No. 245,413, Sep. 21, 1988, abandoned, said Ser. No. 882,754, is a continuation of Ser. No. 491,786, Mar. 12, 1990, abandoned, which is a continuation-in-part of Ser. No. 449,374, Dec. 6, 1989, abandoned, which is a continuation of Ser. No. 245,414, Sep. 21, 1988, abandoned.

[30] Foreign Application Priority Data

Dec. 2, 1986 [FR] France .................. 86 16834
Dec. 2, 1986 [FR] France .................. 86 16836

[51] Int. Cl.$^5$ .................. G01N 27/00; G01R 27/00
[52] U.S. Cl. .................. 264/22; 264/40.1; 425/170; 374/120; 324/71.1; 324/452
[58] Field of Search .................. 264/40.1, 22, 23, 24; 425/144, 170; 374/120; 324/71.1, 452

[56] References Cited

U.S. PATENT DOCUMENTS

| | | |
|---|---|---|
| 3,182,103 | 5/1965 | Blaylock, Jr. et al. . |
| 3,194,668 | 7/1965 | Schlelin et al. . |
| 3,234,462 | 2/1966 | Holdsworth .................. 324/452 X |
| 3,644,605 | 2/1972 | Sessler et al. . |
| 4,248,080 | 2/1981 | West . |
| 4,308,370 | 12/1981 | Fukada et al. . |
| 4,378,322 | 5/1983 | Atterbury et al. . |
| 4,427,609 | 1/1984 | Broussoux et al. . |
| 4,469,649 | 9/1984 | Ibar . |
| 4,486,365 | 12/1984 | Klienmann et al. . |
| 4,508,668 | 4/1985 | Broussoux et al. . |
| 4,560,737 | 12/1985 | Yamamoto et al. . |
| 4,591,465 | 5/1986 | Miyata et al. . |
| 4,800,048 | 1/1989 | Bloomfield et al. . |
| 4,808,352 | 2/1989 | Bhateja . |
| 4,853,163 | 8/1989 | Mendonca, Jr. .................. 264/22 |
| 5,100,589 | 3/1992 | Ticknor .................. 24/22 X |
| 5,219,498 | 6/1993 | Keller et al. .................. 264/40.1 X |

FOREIGN PATENT DOCUMENTS

| | | |
|---|---|---|
| 0199236 | 10/1986 | European Pat. Off. . |
| 1154211 | 4/1958 | France . |
| 2474942 | 8/1981 | France . |
| 2489739 | 3/1982 | France . |
| 46-24480 | 7/1971 | Japan .................. 324/452 |
| 1-110247 | 4/1989 | Japan .................. 324/71.1 |
| 1191624 | 5/1970 | United Kingdom . |

*Primary Examiner*—Catherine Timm
*Attorney, Agent, or Firm*—Seidel, GOnda, Lavorgna & Monaco

[57] ABSTRACT

A moldable material, which either has dipoles or other charged particles therein, or is susceptible to their creation, is introduced into a mold or is passed through a die. The material is then subjected to a polarization medium until either at least some of the dipoles or other charged particles are oriented in the direction of the polarization medium, or until at least some dipoles or other charged particles are created thereby. Thereafter, the material is permitted to cool. Once cooled, the molded material is separated from the mold or die. The effect of polarizing the moldable material is then analyzed by permitting an at least partial relaxation of the dipoles or other charges therein which were polarized or created. This relaxation results in a measurable current which is related to the actual temperature of the material at the time the polarization medium was applied. By repeating this process wherein the only significant variable is the time at which the polarization medium was applied, a cooling profile can be prepared for the moldable material, the mold and/or the die.

20 Claims, 7 Drawing Sheets

PROCESS FOR DETERMINING THE ACTUAL TEMPERATURE OF A MOLDABLE MATERIAL CONTAINED WITHIN A MOLD OR PASSED THROUGH A DIE

CROSS-REFERENCE INFORMATION

This application is a continuation-in-part of co-pending U.S. application Ser. No. 07/882,754 filed on May 11, 1992, now abandoned, which is a continuation of U.S. application Ser. No. 491,786 filed Mar. 12, 1990, now abandoned, which is a continuation-in-part of U.S. application Ser. No. 449,374 filed on Dec. 6, 1989, now abandoned, which is a continuation of U.S. application Ser. No. 245,414 filed on Sep. 21, 1988, also now abandoned.

This application is also a continuation-in-part of co-pending U.S. application Ser. No. 07/903,062 filed on Jun. 22, 1992, now U.S. Pat. No. 5,271,876, which is a continuation-in-part of co-pending U.S. application Ser. No. 663,988 filed Feb. 4, 1991, now abandoned, which is a continuation-in-part of U.S. application Ser. No. 245,413 filed on Sep. 21, 1988, now abandoned.

FIELD OF THE INVENTION

This invention pertains to a method for determining the temperature of a moldable material while contained within a mold or while passing through a die.

BACKGROUND OF THE INVENTION

A commonly practiced method of forming plastic materials into a desired shape employs the use of a prefabricated mold or die. Examples of typical molding processes include, without limitation, compression molding, transfer molding, injection molding, blow molding, foam molding, casting, plastisol casting, foam casting, thermo-forming, extrusion molding and the like. In these types of molding processes, a moldable material is introduced into, over, under, around or through a mold or die.

Typically, at some time during most molding processes, the material contained within the mold or passing through the die is in the form of a liquid or softened solid. Then, through the use of pressure (positive or negative, depending on the particular molding process), the moldable material is forced to conform to the shape of the mold or die. After the liquid (or softened solid) material conforms to the shape of the mold or die, the material is cooled to a temperature below that which it will not disfigure once removed therefrom. Typically, this is a temperature below the material's temperature of solidification (i.e., crystallization or glassification depending upon the particular material being molded).

In molding processes wherein there is a change in the physical state of the material contained within the mold or die, it is imperative to know when the material is ready to be removed therefrom. For example, if the molded material is removed too early, its shape can be susceptible to disfigurement. On the other hand, if the material is held in the mold too long, this can have adverse affects on the physical properties of the final product, as well as, increase production time which, in turn, decreases production output.

Moreover, in these types of molding processes, it is also imperative to know the time it takes for the moldable material to go from a temperature where it is in the form of a liquid or a softened solid to a temperature where it is in the form of a hardened solid. For example, if the molded material makes this transformation too rapidly, there may not be sufficient time for its molecules to orient in the desired manner. On the other hand, if the molded material makes this transformation too slowly, this can also have adverse affects on the final product's desired physical properties, as well as, increase production time which decreases production output.

As can be seen from the above, in many molding processes, it is essential to monitor the temperature of the material contained within the mold or passing through the die. Typically, heat sensors, such as thermocouples and infrared sensing devices, are used for this purpose. However, notwithstanding the present popularity of employing such heat sensors, there are many problems associated therewith.

For example, in conventional molding applications, thermocouples couples are not in direct contact with the material being molded. Specifically, thermocouples are typically imbedded into a probe having a metallic membrane or sheath which is designed to isolate the thermocouple from the moldable material's surface. Therefore, since thermocouples do not directly contact any part of the material being molded, they cannot be used as a means for accurately identifying the material's temperature in non-isothermal conditions. This phenomena can create a thermal lag effect which, in turn, can result in large errors when comparing the material's monitored temperature to its "actual" temperature at any given point in time during the molding process.

On the other hand, with regards to the implementation of infrared sensing devices, they too are plagued with inherent shortcomings in addition to being very expensive. For example, such infrared devices can only be successfully employed while the material being molded is above 120° C. Therefore, for many commercial polymers (polyethylene, polypropylene, polystyrene, etc.), as soon as the moldable material solidifies, this temperature sensing means is no longer adequate. Moreover, it is also common knowledge that such infrared sensing devices have a limited temperature range.

Another shortcoming of infrared sensing devices is their relative cost. For example, based on other conventional heat sensors used for this purpose, infrared sensing devices are very expensive. This shortcoming is compunded by the fact that if it is desired to sense the temperature at different points in the mold, it is necessary to use additional infrared sensing devices, thereby increasing costs.

Other general shortcomings of conventional heat sensors are that they are typically associated with the mold's or die's inside wall surface. Accordingly, they are designed to only monitor the surface temperature of the material being molded. Therefore, these devices are unable to accurately monitor the material's internal temperature during a molding process. Since a material's internal temperature can differ significantly from its surface temperature, structural defects can result if proper measures are not taken to compensate for this difference.

As seen from the above, conventional sensing devices are either limited or unable to accurately track the material's actual temperature at any given point in time during the molding process. This is due, in part, to inherent features associated with their use (e.g., time lag, heat loss, presence of membranes through which the temperature must be monitored, etc.). Therefore, a margin of error is typically associated with their use.

Notwithstanding these problems, such heat sensing devices are presently the temperature monitoring systems of choice. However, if a means existed which could accurately monitor the temperature of a material throughout the molding process, it could be used to plot a cooling profile for a particular mold or die set-up. This would significantly enhance quality control, as well as, maximize production output and control in molding processes and processes such as, for example, those recited in U.S. Pat. No. 4,469,649 which are designed to alter the theological properties of a moldable material. Moreover, the advent of such a means would also eliminate the problems associated with the use of conventional heat sensors since they would become obsolete or at the most complementary in the case of infrared for the higher temperature ranges. Accordingly, the industry would graciously welcome such an improvement.

SUMMARY OF THE INVENTION

One object of this invention is to provide an improved means for monitoring the temperature of a material contained within a mold or passing through a die during a molding process.

Another object of this invention is to provide a means for determining the temperature profile for a particular material contained within a particular mold and/or die, throughout the molding process.

Yet another object of this invention is to provide a means for determining the temperature of a particular material contained within a particular mold or die at any time during the molding process.

Still another object of this invention is to provide a means for maximizing production output of a particular mold or die which is designed to mold a particular material.

A further object of this invention is to provide a means for measuring the temperature at which the process set out in U.S. Pat. No. 4,469,649 can be operated to optimize its controls.

Even a further object of this invention is to provide a means for determining the optimum time to remove a particular molded material from a particular mold or to pass it through a particular die.

Still a further object of the invention is to provide a means for probing the temperature through the thickness of the material by varying the intensity of the field and the time of polarization.

An even further object of the invention is to provide a means for determining the temperature configuration in the mold at different locations in the part by having several probes which are excited by the voltage field at the same time and then, upon depolarization, the intensity of the current or the current measurement may be compared for all the different locations in the mold, yielding a thermal stress map or temperature map.

These and other objects are achieved through the advent of a novel temperature monitoring and/or controlling process. In this novel process, a non-conductive, moldable material is pressed, injected, suctioned or extruded into a mold or through a die. This moldable material either has dipoles or other electrically-charged particles therein which are modified (excited) by the voltage field, or is susceptible to the creation of dipoles or other electrically-charged particles therein when it is subjected to a polarization medium.

While confined within the mold or passing through the die, the material is at least partially polarized by being subjected to a polarization medium of a given intensity for a given period of time. The intensity and the time of application of the polarization medium being applied depends, in part, upon the polarizability of the material in the mold, the thickness of the material at the spot investigated, and when the material is thick, it depends on the depth at which the temperature must be probed within the thickness.

During the polarization step, the material is subjected to this given polarization medium until either at least some of the dipoles or other charged particles therein are oriented in the direction of the field, or until at least some dipoles or other charged particles are created thereby.

As the material is being polarized, the mold is continuously cooled. In one embodiment, the polarization medium is applied to the material and is permitted to continue throughout the cooling process. The actual temperature of the material at the time the polarization medium is applied is referred to herein as "$T_p$". However, in an equally useful embodiment, the polarization medium is applied at $T_p$ and removed at $(T_p - \delta)$, where $\delta$ is typically short (1 sec. to 1 min.) In this latter embodiment, the polarization medium is adjusted to create a polarization effect in the material which can, upon reheating in a TSC ("thermal stimulated current") experiment, be easily correlated to $T_p$.

Once the polarized material has cooled to the appropriate temperature, the effect of polarizing the moldable material during the molding process is analyzed. This is accomplished by permitting an at least partial relaxation of the polarized dipoles or other charges therein, for instance obtained by thermal stimulated current recovery. This relaxation results in the disorientation of, and/or decrease in, at least some of the dipoles or other charged particles within the polarized material. The disorientation of, and/or decrease in, the dipoles or other charged particles generates a measurable electrical current, typically a peak. A relationship exists between the current characteristics, for instance the peak maximum position $T_m$, and the temperature $T_p$ at which the polarization was performed. By polarizing at different times during successive cooling runs, and determining $T_p$ through $T_m$ by TSC, the invention can be used to identify the actual temperature of the material at any point in time during the molding process. By using several spark probe electrodes at different places in the mold, the invention permits measurement of the temperature profile at different points in the molded material.

Another advantage of the present invention is that it can be used to calibrate temperature devices such as RTD thermometers, thermocouples or infrared sensors.

Other objects, aspects and advantages of the present invention will be apparent to those skilled in the art upon reading the specification and the appended claims which follow.

A more complete appreciation of the present invention and many of the attendant advantages thereof will be readily ascertained as the invention becomes better understood by reference to the following detailed description, when considered in connection with the accompanying figures briefly described below.

DETAILED DESCRIPTION OF THE INVENTION

There is a need in the industry to be able to monitor and control the actual temperature of a moldable material in a mold or passing through a die at any particular point in time during the material's cooling cycle. Although the industry is aware of the importance of knowing and controlling the material's "actual" temperature, none of the conventional sensing devices employed today can successfully and/or economically accomplish this goal. For example, thermocouples inserted near the mold's or die's surface merely provide the temperature of the mold or die at that location while the moldable material is positioned or passing thereover. Moreover, infrared devices cease to function when the moldable material solidifies below 100° C.

Contrary to the above, this invention provides a successful and economic means for monitoring and controlling the actual temperature of a material in a mold or die at any particular point in time during the material's cooling cycle. This is accomplished through the implementation of a polarization medium. Specifically, when practicing the present invention, while the moldable material is confined within a mold, or is passed through a die, the material is subjected to a polarization medium either until the orientation of at least some of its dipoles or other internal charges is altered, or until dipoles or other charged particles are created thereby.

Subjecting the moldable material to such an polarization treatment at a particular point in time during the molding process results in a tagging effect which can be revealed after the molding process is completed via TSC testing. The current generated during the TSC test is manifested in the shape of a curve whose shape and other characteristics are related to the temperature of the material when polarized (i.e., "$T_p$") at the time it was polarized (i.e., "$t_p$"). By analyzing the TSC curve of such a charged material, the actual temperature of the material ($T_p$) at the particular point in time that it was treated ($t_p$) can be determined.

Now, if a particular moldable material is polarized as set out above a number of times, and if the only significant variable in each polarization treatment process is the time at which the treatment took place (i.e., $t_p$), the TSC test can be used to plot $T_p$ vs. $t_p$. This plot shows the actual temperature of the material at any point in time along that line.

The present invention is applicable for establishing a cooling profile for a mold, die and/or moldable material when the material being molded is non-conductive and either has dipoles or other charged particles therein, or is susceptible to the creation of dipoles or other charged particles when subjected to a polarization medium.

As used herein, the term "polarization medium" refers to any medium which can alter the polarity of a non-conductive, moldable material. As used herein, the phrase "non-conductive", when referring to a particular moldable material, is used to encompass those materials which have at least some capacitative properties. In other words, "non-conductive, moldable materials" would exclude those materials which cannot be subjected to the orientation of their internal dipoles or cannot have electrically-charged ionic or free space charges created therein (e.g., "conductors").

Examples of moldable materials which can be classified as "non-conductive" include, without limitation, plastic materials, polymeric materials, rubbery materials, filled or unfilled composite materials, and the like, and/or blends thereof. Moreover, examples of such materials include, without limitation, thermoplastics, thermosets, composites, wood in a pasty form, and the like, and/or blends thereof. Specific examples of such materials which can be subjected to the process disclosed herein include, without limitation, polyethylene, polypropylene, nylons, PET, polystyrene, PMMA, polycarbonates, and the like, and/or blends thereof.

Once selected, the non-conductive moldable material is pressed, injected, suctioned or extruded into a mold or through a die. This initiates what is referred to herein as the "molding process".

Any suitable molding process known to those skilled in the art can be used when practicing this invention. Examples of particularly applicable processes include, without limitation, compression molding, transfer molding, injection molding, blow molding, foam molding, casting, plastisol casting, foam casting, thermoforming, and the like.

Figure 7:
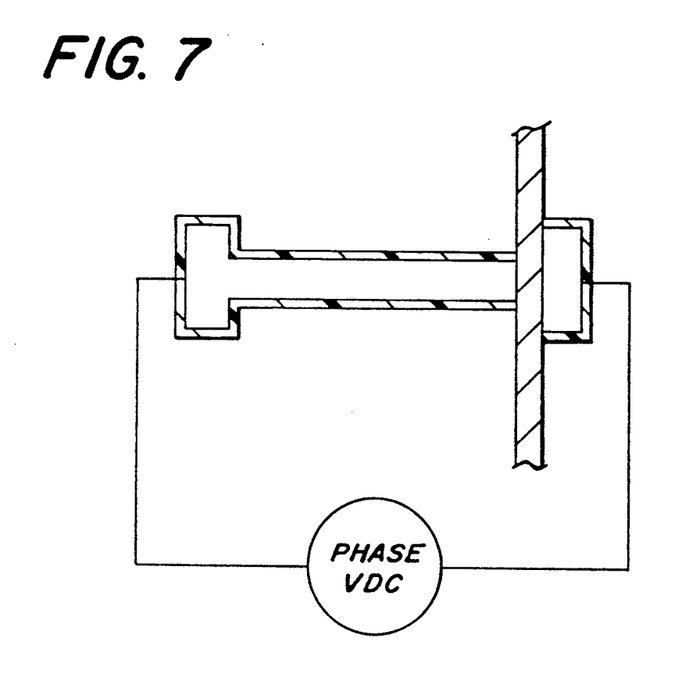
FIG. 7 is a schematic of one embodiment of a probe which can be used when practicing this invention.
Figure 8:
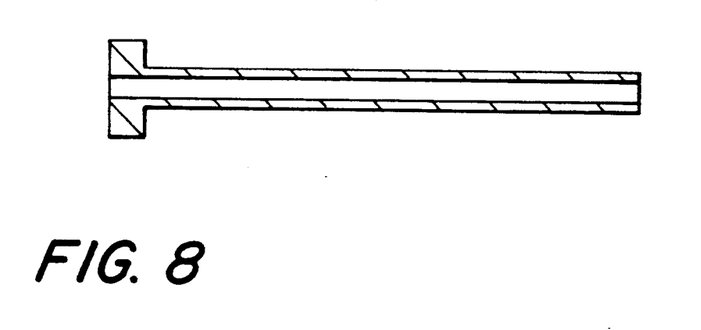
FIG. 8 is a schematic of another embodiment of a probe which can be used when practicing this invention.

Regardless of the molding process employed, in accordance with the present invention there must be associated therewith a means for applying a polarization medium to the moldable material contained therein or passing therethrough. Any suitable means known to those skilled in the art can be employed. One example of such suitable means includes, without limitation, connecting two probe electrodes e.g., (spark pin electrodes) to a voltage supply (ac or dc), each probe being on either side of the part molded, and having a small current flowing therebetween. Another means would be to have a single probe on one side only of the mold, with the electrode comprising two parts which would generate a voltage field which would have a local effect on the part molded. Specific embodiments of means by which a voltage field can be implied in accordance with the present invention are illustrated in FIGS. 7 and 8.

It should be understood that the present invention is not limited to dc voltage fields, but rather encompasses both ac and dc voltage fields. In addition to polarization by an ac or dc voltage field, other ways of polarizing the material include the implementation of polarization mediums such as ultrasonic waves or mechanical perturbation in the case of piezoelectric materials and magnetic perturbation for non-conductive materials which are susceptible to magnetization. In such a case, the magnetic field can be either an ac or dc field, which will sensitize and magnetize the material while the material is cooled. Naturally, as those skilled in the art will recognize, a magnetic detector to detect demagnetization due to thermal stimulated recovery would be employed to measure demagnetization of the work done during magnetization. In fact, in the case of piezoelectric materials, the applied field can be a force which is applied during cooling. This force will result in the creation of charges in that particular temperature in the material which are then frozen into the material and, upon recovery by thermal stimulation, it will be possible to observe a current discharge which is the result not of the application of a voltage field but by the application of pressure or stress.

During at least the initial moments of a molding process, the material is at a temperature wherein: (a) the dipoles or other charged particles therein can be oriented in the direction of a polarization medium, or (b) dipoles or other charged particles can be formed therein when the material is subjected to a polarization medium.

While the material is susceptible to the orientation or creation of dipoles or other charged particles, the material is polarized by being subjected to a polarization medium. This polarization medium is applied to the material at a given intensity for a given period of time.

Upon reading this disclosure, those skilled in the art will be able to determine the appropriate voltage (or other field) intensity which suits their specific needs. The preferred intensity depends, in part, upon criteria such as: the material's susceptibility to being polarized, the time period over which it will be applied to the material, the temperature of the material at the time the polarization medium is applied, the material's cooling rate, etc. For a dc voltage field, the intensity typically ranges between 1 volt and 1200 volts, and preferably between 1 volt and 500 volts. For an ac field, the frequency is unimportant but is preferably a low frequency, such as 60 Hz, although frequencies up to 1 MHz can be used.

Once an appropriate intensity is selected, it is applied to the moldable material within the mold or passing through the die until either at least some of the dipoles or other charged particles therein are oriented in the direction of the polarization medium, or until at least some dipoles or other charged particles are created thereby. Upon reading this disclosure, those skilled in the art will be able to determine an appropriate time period over which to apply the selected polarization medium. The preferred time period depends, in part, upon criteria such as: the material's susceptibility to being polarized, the temperature of the material at the time the polarization medium is applied, the intensity of the polarization medium being applied to the material, the material's cooling rate, etc.

As the material is being polarized in accordance with the present invention, the mold is continuously cooled. In one embodiment, the polarization medium is applied and maintained throughout the material's cooling process. However, in an equally useful embodiment, the polarization medium is applied and adjusted for a short period of time during the material's cooling process.

Once the polarized material has had at least some dipoles or other charged particles reoriented or created by the polarization medium, while cooling, it is separated from the mold or die.

The effect of polarizing the moldable material during the molding process is then analyzed by a process which permits an at least partial relaxation of the dipoles or other charges therein which were polarized or created. This analysis can be accomplished by any means known to those skilled in the art. One such means is to subject the molded material to a TSC analysis.

In this type of an analysis, the location in the molded material which was subjected to the polarization treatment is placed into a TSC-type device. These types of devices are designed to measure the conductance of a material while subjecting the material to a linear or programmable temperature increase. At a certain temperature range, the charges which were created begin to release, and/or the dipoles which were polarized begin to disorient themselves. This release and/or disorientation is referred to herein as "relaxation".

In accordance with the present invention, there must be an at least partial relaxation of the polarized dipoles or other electrically-charged particles in order to determine the temperature of the non-conductive multiple material contained within the mold or die at the time the polarization medium was applied. This relaxation must result in the disorientation of, and/or decrease in, at least some of the dipoles or other charge within the polarized material.

This relaxation must generate a measurable electrical current. The minimum current which must be generated thereby depends, in part, on the type of analyzing device employed. A preferred analyzing device would be an electrometer capable of reading current intensities between $10^{-16}$ to $10^{-9}$ amperes.

After the relaxation current is measured, a relationship is established between this current and the temperature at which the polarization treatment step was performed during the molding process. In a TSC-type analysis, the relaxation current, peak height, peak location, peak maximum and peak width are all related to the actual temperature of the material at the time it was polarized ($T_p$). Accordingly, the actual temperature of the material at that particular point in time during the molding process can be determined.

By repeating this process disclosed herein, wherein the only substantial variable being the time at which the polarization medium is applied, a cooling profile for a particular material, mold and/or die can be established. As the number of times this process is repeated increases, so does the accuracy of the cooling profile. This profile can, in turn, be used to identify the actual temperature of the material at any point in time during the cooling process.

An example of how this invention can be used to determine the actual temperature of a moldable material at any time during the molding process, is illustrated in FIGS. 1–6. It should be noted, however, that this example is merely one illustration of how this invention can be implemented. Accordingly, the scope of this invention should not be limited thereto.

Figure 1:
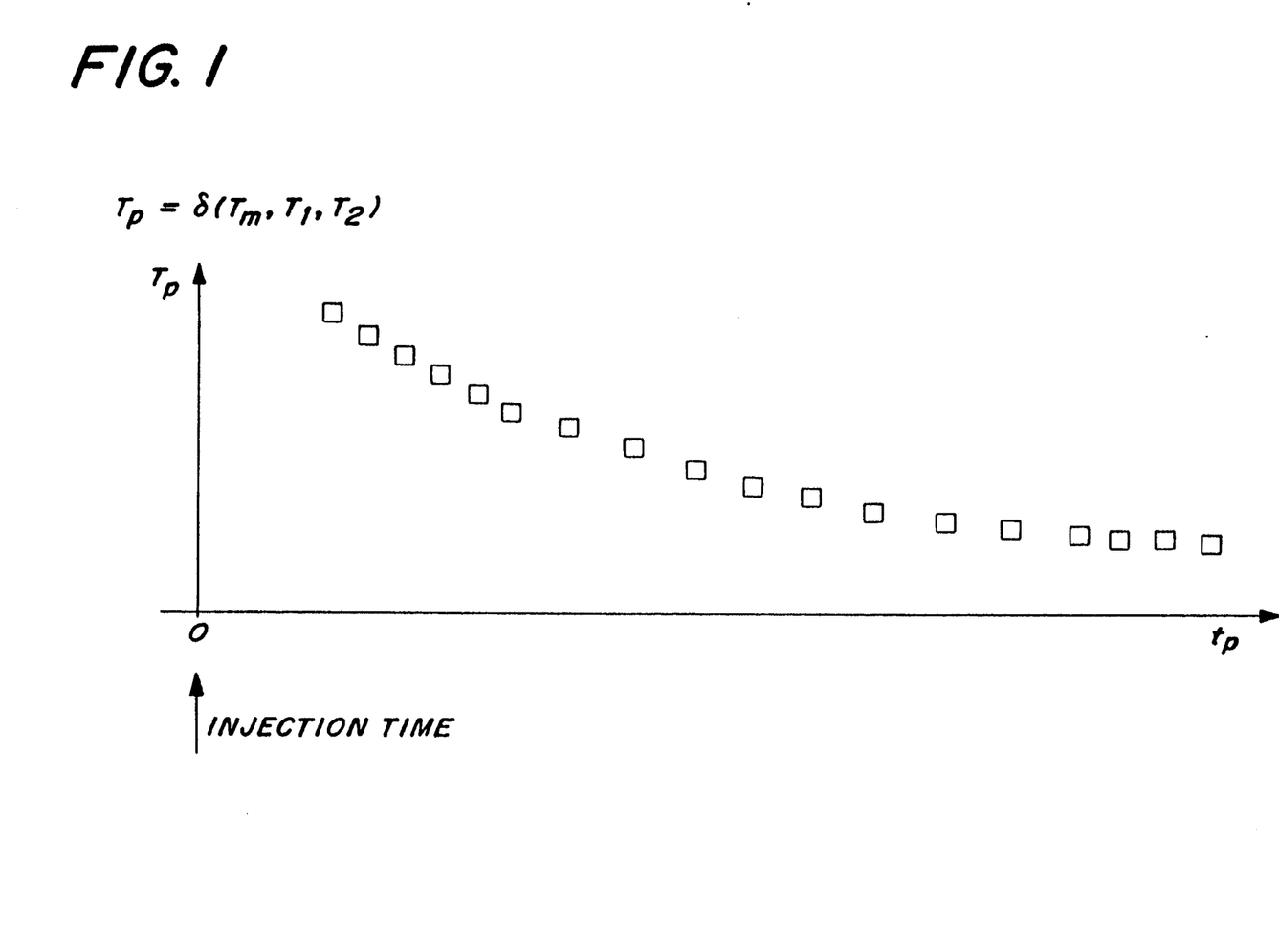
FIG. 1 is a graph illustrating a single discharge current generated by the depolarization of a moldable material which was polarized in accordance with the present invention.

Referring now to FIG. 1, this Figure illustrates the TSC testing of a material which was polarized in accordance with the present invention, wherein the polarization medium is a voltage field. In this Figure, the horizontal axis represents an increasing temperature; and, the vertical axis represents an increasing current.

As can be seen, the material being analyzed discharges a current over a particular temperature range. In this particular instance, the current being discharged is the result of the disorientation of dipoles which were polarized during the electrical treatment step. The peak of this current discharge curve is referred to in FIG. 1 as "$T_m$".

Figure 2:
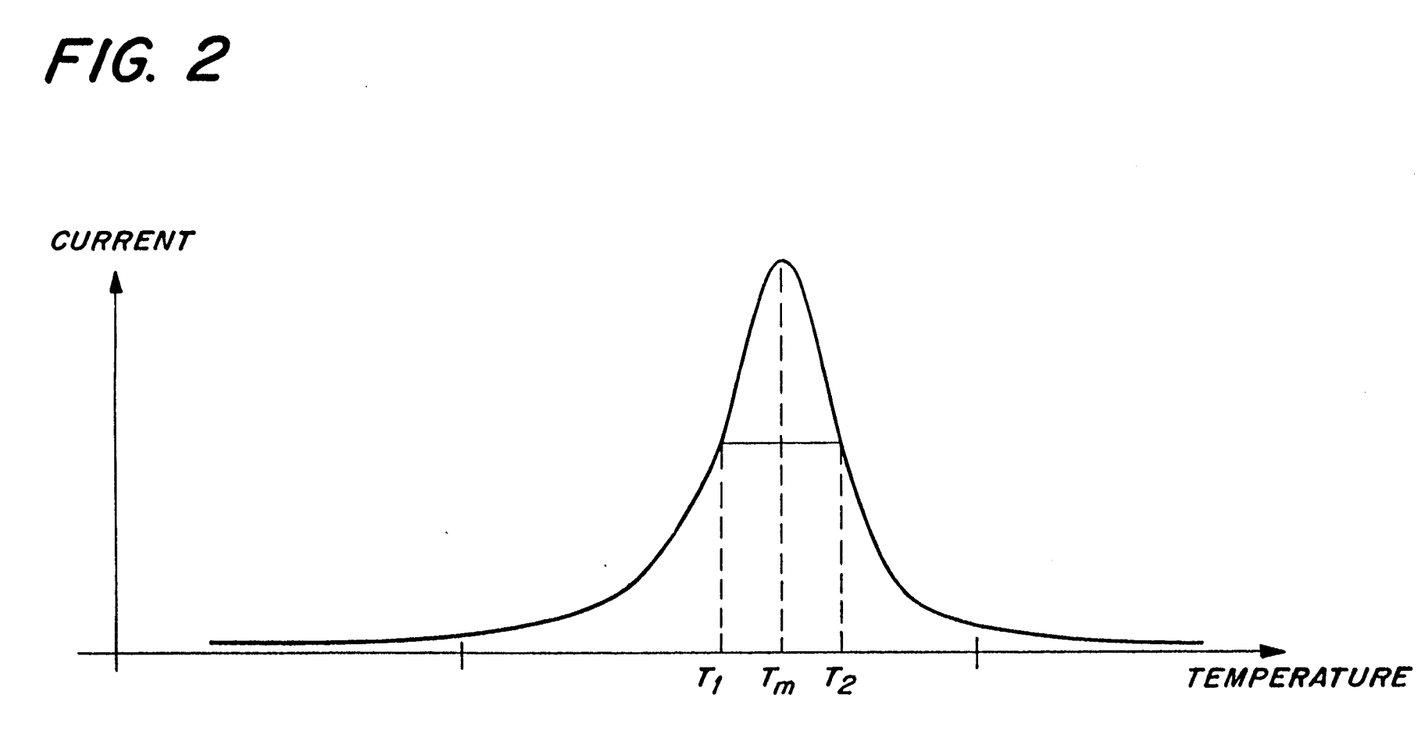
FIG. 2 is a graph illustrating a temperature profile prepared in accordance with the present invention for a particular mold or die.

By varying the time ($t_p$) at which the material is polarized in accordance with the present invention, a cooling profile can be established for a particular material, mold and/or die by plotting $T_p$ vs. $t_p$. An example of such a profile is illustrated in FIG. 2. Once such a cooling profile is established, the actual temperature of the material at any time during the particular molding process can be determined.

One method in which $T_p$ can be accurately determined is to polarize the material only for a predetermined time such that the polarization process remains in the Debye range close to what is referred to as thermal windowing conditions. (See, Ibar, J. P., "Application of Compensation Phenomena to the Thermal Analysis Characterization of Polymers: Introducing the Degree of Disorder (DOD) Number," Polym. Eng. Sci., 1467 (1991)). When this occurs, the TSC curve is a Debye peak which can be fitted with a Debye equation. The $T_{m,d}$ of this equation is equal to $T_p$.

Another way in which this invention can be practiced is to calculate $\Delta H_p$ and $\Delta S_p$ from the Arrhenius transform of the Current-Temperature curve. (See, Ibar, J. P., "Application of Compensation Phenomena to the Thermal Analysis Characterization of Polymers: Introducing the Degree of Disorder (DOD) Number," Polym. Eng. Sci., 1467 (1991)). In addition to this, the sub-$\Delta H$ vs. sub-$\Delta S$ curve from the thermal-window current curve can be plotted. As used herein, sub-$\Delta S$ is the slope at temperature T and sub-$\Delta H$ is the intercept of that slope at temperature T for plots of $\Delta G$ vs. T obtained from the following equation:

$$\frac{\Delta G}{T} = Ln\tau + Ln\left(\frac{kT}{h}\right)$$

$$\Delta G = (\text{sub} - \Delta H) - T(\text{sub} - \Delta S)$$

where k and h are Boltzmann's and Planck's constants respectively and $\tau$ is the relaxation time calculated at each temperature during the depolarization curve, (See, Ibar, J. P., "Application of Compensation Phenomena to the Thermal Analysis Characterization of Polymers: Introducing the Degree of Disorder (DOD) Number," Polym. Eng. Sci., 1467 (1991)). When (sub-$\Delta S$)=0, it is seen that (sub-$\Delta H$)$_0$=$\Delta G_p$=$\Delta H_p$−$T_p \Delta S_p$ when (sub-$\Delta S$)=0.

Moreover, it is also seen that (sub-$\Delta H$)$_0$ is obtained from the sub-EE plot (5th column of the Table). This is an experimental value and $\Delta H_p$, $\Delta S_p$ are also experimental values from the Arrhenius transform:

$$T_p = \frac{+((\text{sub} - \Delta H)_o - \Delta H_p)}{\Delta S_p}$$

Figure 3:
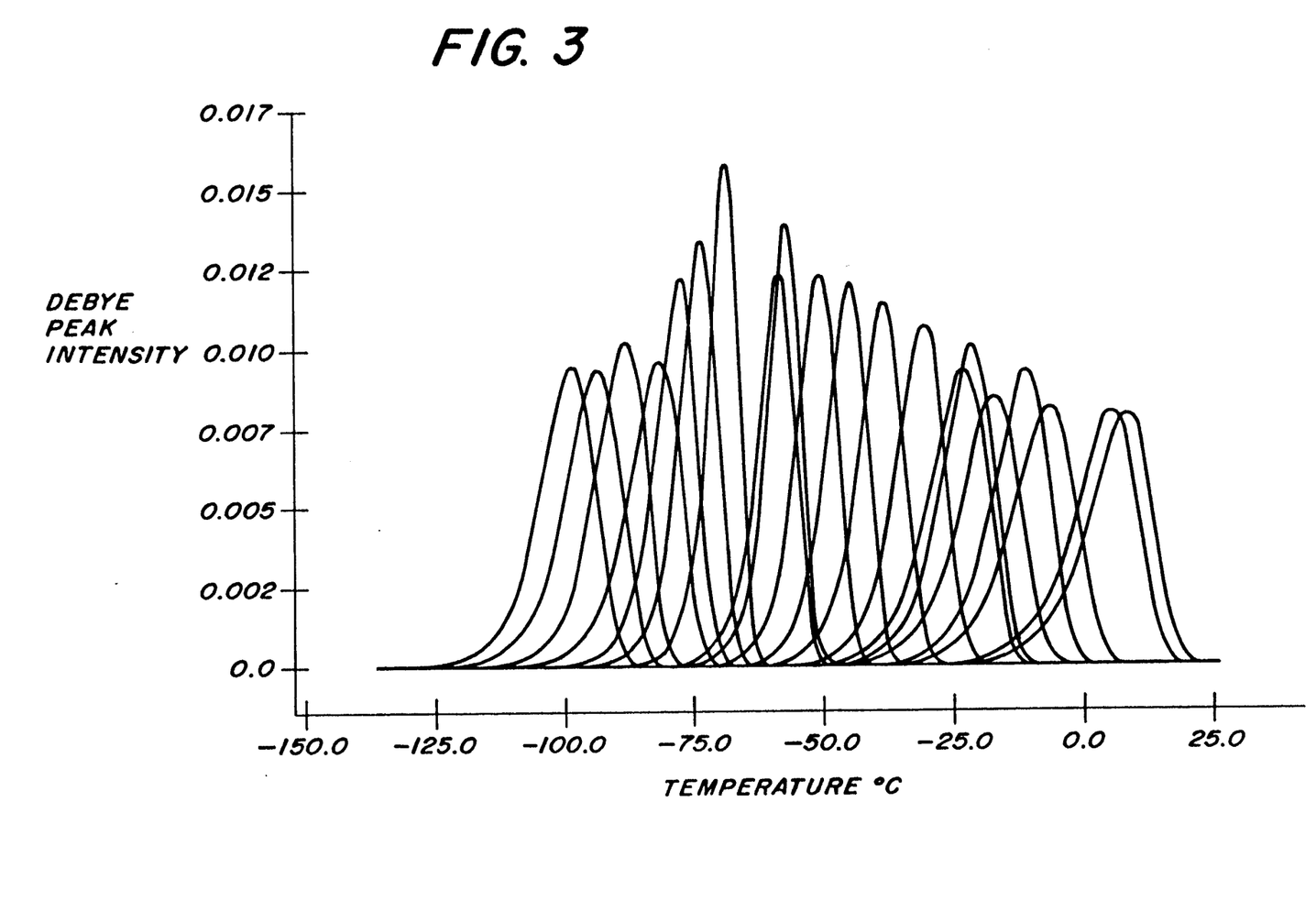
FIG. 3 is a graph illustrating a plurality of discharge currents, each generated by the depolarization of a moldable material polarized in accordance with the present invention at a different time ($t_p$) during the molding process.

FIG. 3 is a graph illustrating several discharge currents measured during a TSC analysis. These discharge currents result from a material which was polarized in accordance with the present invention, wherein the polarization medium was a voltage field. Each peak identifies a different time during the cooling process at which the voltage field was applied. Specifically, the peaks identify the intensity of the discharge current which was normalized and treated mathematically with a Debye function vs. temperature as the temperature, during the analysis, was being increased at rate of about 7° C. per minute.

Figure 4:
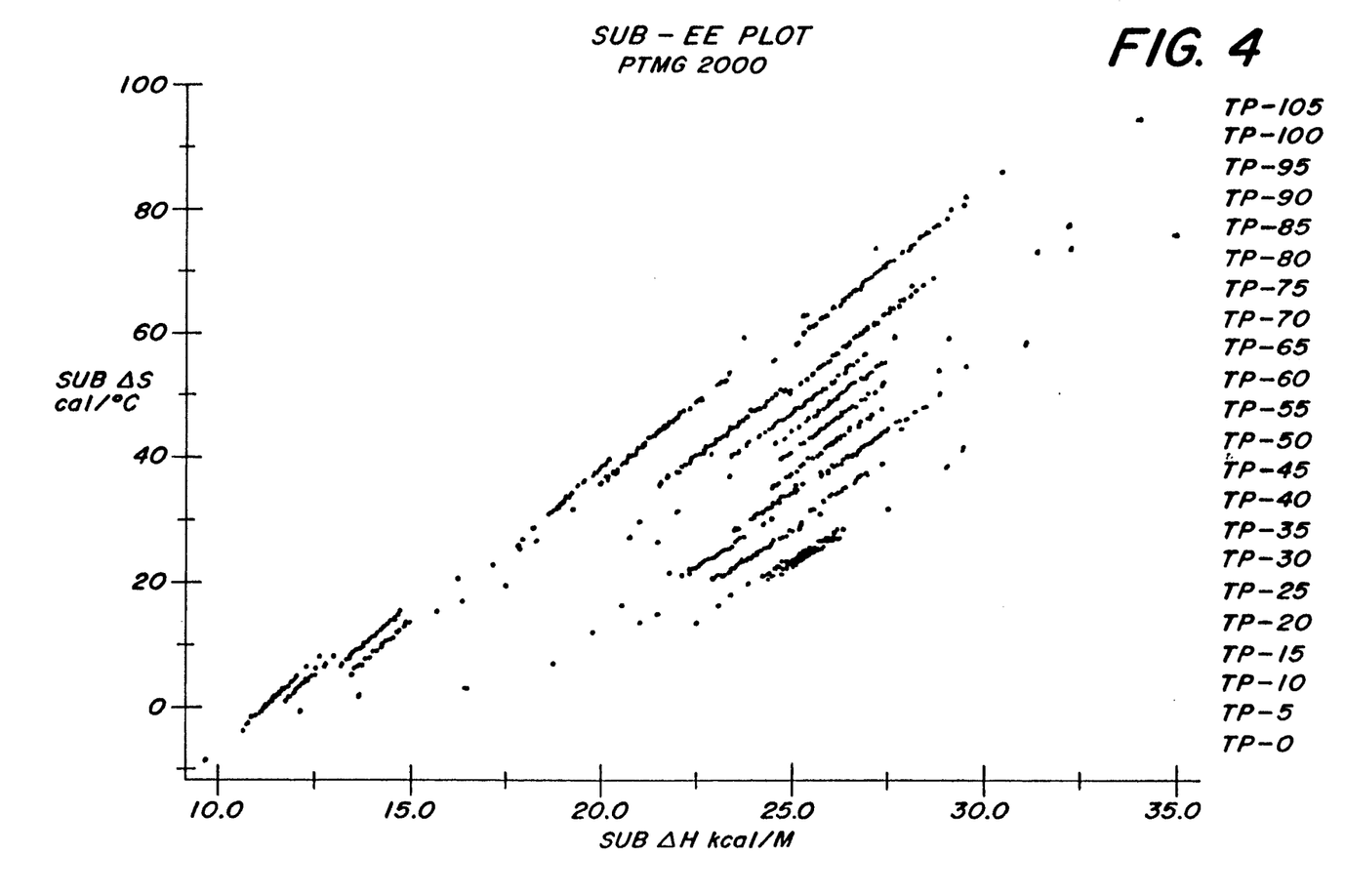
FIG. 4 is a graph illustrating linear functions for each of the discharge currents identified in FIG. 3.
Figure 5:
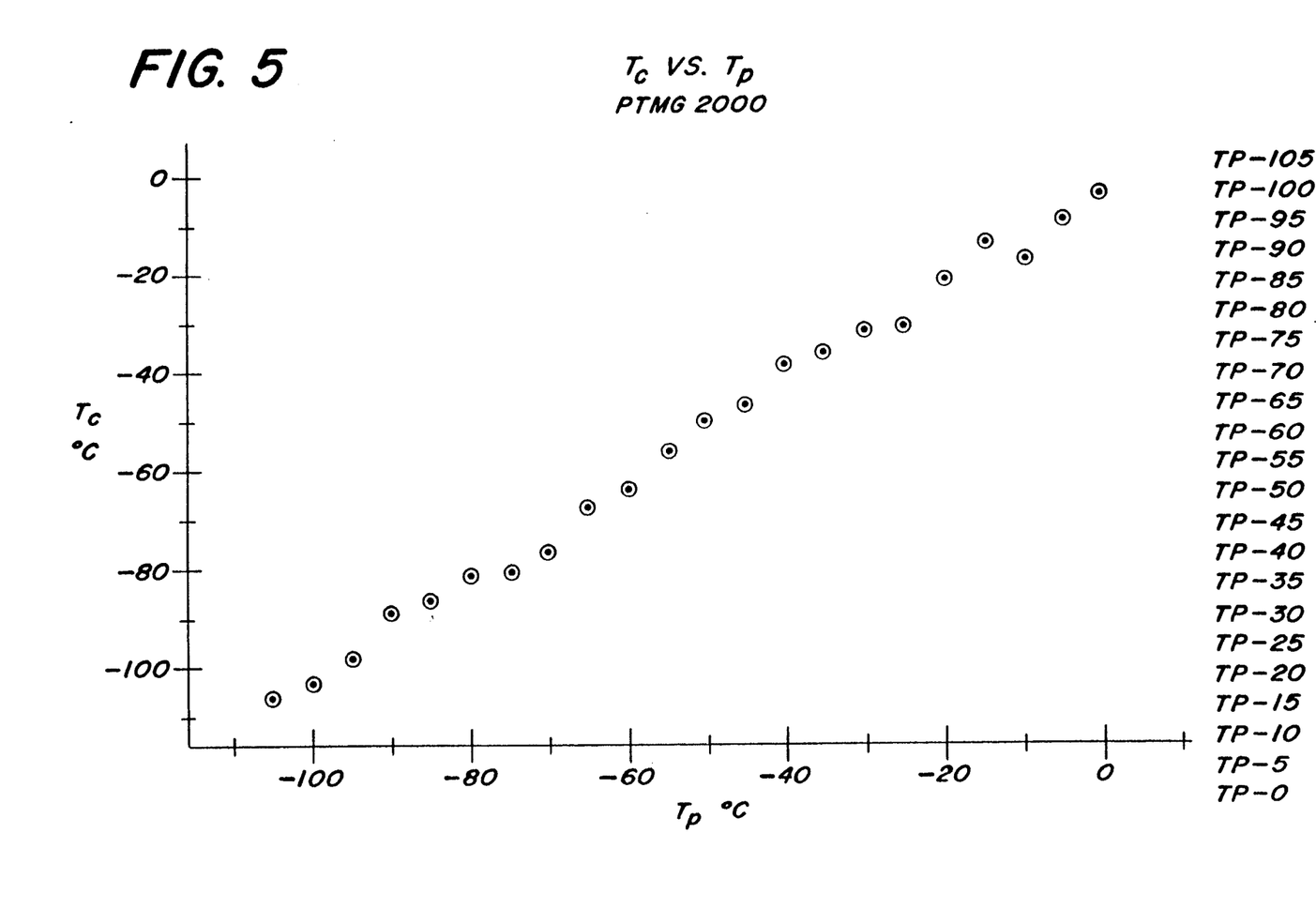
FIGS. 5 and 6 are graphs illustrating a correlation between the $T_c$ vs. $T_p$ based upon information from the graphs in FIGS. 3 and 4.

In FIG. 5, the discharge current curves in FIG. 4 were transformed to their respective linear functions. The sub-$\Delta S$ and sub-$\Delta H$ shown in FIG. 5 are the conversion of the peaks for each peak from its derivative. For each point, the parent slope and intercept with the time axis can be determined. The slopes of the lines are related directly to the actual temperature at the time the material was electrically treated. Data related to FIGS. 3-5 is set out in the following Table.

TABLE

| Line No. | $T_p$ (°C.) | $T_m$ (°C.) | $T_c$ (°C.) | sub $\Delta H_o$ | sub $\Delta S_o$ | $r^2$ |
|---|---|---|---|---|---|---|
| 1 | −105.0 | −98.2 | −106.1 | 11.350 | −67.941 | 0.9990744 |
| 2 | −100.0 | −93.4 | −103.1 | 11.686 | −68.706 | 0.9995979 |
| 3 | −95.0 | −88.2 | −98.6 | 12.089 | −69.259 | 0.9997134 |
| 4 | −90.0 | −81.6 | −88.7 | 12.507 | −67.789 | 0.9992985 |
| 5 | −85.0 | −77.4 | −86.0 | 12.910 | −68.976 | 0.9995453 |
| 6 | −80.0 | −73.0 | −81.6 | 13.238 | −69.113 | 0.9995379 |
| 7 | −75.0 | −73.2 | −80.4 | 13.196 | −68.463 | 0.9996719 |
| 8 | −70.0 | −68.4 | −76.6 | 13.677 | −69.575 | 0.9999300 |
| 9 | −65.0 | −57.6 | −67.5 | 14.364 | −69.845 | 0.9998505 |
| 10 | −60.0 | −56.4 | −64.0 | 14.413 | −68.919 | 0.9998466 |
| 11 | −55.0 | −49.4 | −56.8 | 14.034 | −68.577 | 0.9996750 |
| 12 | −50.0 | −43.8 | −50.4 | 15.196 | −68.226 | 0.9996417 |
| 13 | −45.0 | −37.2 | −46.9 | 15.787 | −69.781 | 0.9997495 |
| 14 | −40.0 | −29.8 | −30.6 | 16.233 | −69.194 | 0.9997041 |
| 15 | −35.0 | −22.6 | −36.4 | 16.847 | −71.154 | 0.9999193 |
| 16 | −30.0 | −21.2 | −32.1 | 16.896 | −70.081 | 0.9995859 |
| 17 | −25.0 | −17.0 | −31.0 | 17.175 | −70.911 | 0.9999300 |
| 18 | −20.0 | −11.0 | −21.7 | 17.572 | −69.883 | 0.9999150 |
| 19 | −15.0 | −6.5 | −14.4 | 17.752 | −68.610 | 0.9997271 |
| 20 | −10.0 | −6.7 | −17.5 | 17.787 | −69.569 | 0.9996618 |
| 21 | −5.0 | 5.3 | −9.4 | 18.758 | −71.117 | 0.9997897 |
| 22 | −0.2 | 8.4 | −4.0 | 18.900 | −70.229 | 0.9996260 |

In the Table set out above, the column $T_p$ indicates the temperature of polarization. The column $T_m$ indicates the temperature of the maximum of the peak of the small peaks observed in FIG. 3. The column $T_c$ indicates the temperature which is the inverse of the slope of the different lines shown in FIG. 4. The sub-$\Delta H_o$ and sub-$\Delta S_o$ columns are basically the intercept on both axes of the lines shown in FIG. 4.

By analyzing the data set out in columns $T_p$, $T_m$ and $T_c$, a correlation can be established between $T_m$ and $T_p$, or $T_c$ and $T_p$. This correlation can be employed to determine the actual temperature of the material at the time it was polarized.

Figure 6:
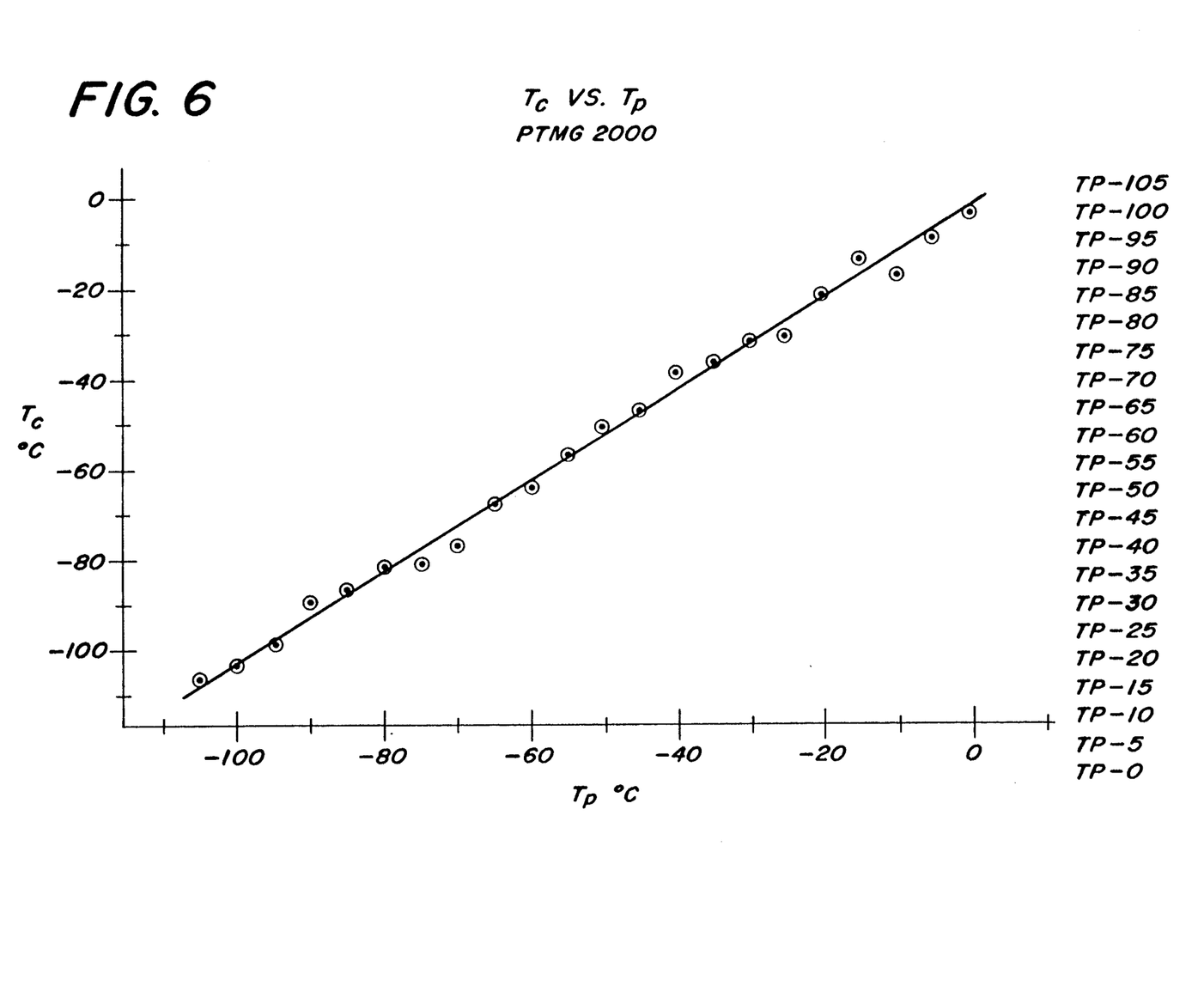

Graphs showing cooling profiles associated with the data set out in the Table and that illustrated in FIGS. 3 and 4 are shown in FIGS. 5 and 6. Specifically, in FIGS. 5 and 6, the $T_c$ data is plotted against the $T_p$ data. This shows that there is a good correlation therebetween. Accordingly, by applying this information, one can correlate with a high degree of accuracy the actual temperature at any time during the molding process.

The equation of the straight line passing through the data in FIG. 6 is as follows:

$T_c = 1.0027 T_p − 2.0187$ where $T_p$ and $T_c$ are in degrees Kelvin.

Based upon this equation, it can be seen that $T_c$ is equal to ($T_p$−2) in degrees C. or Kelvin. Accordingly, this establishes a simple correlation between $T_c$ and $T_p$. Moreover, since $T_c$ is obtained as the inverse of the slope of the lines in FIG. 4, a straightforward method of determining the temperature of a material at any time during a molding process can be established.

As indicated above, any suitable means can be employed to apply a polarization medium to the moldable material in accordance with the present invention. FIGS. 7 and 8 illustrate two presently preferred embodiments for applying a polarization medium in the form of a voltage field.

FIG. 7 pertains to a probe which we will refer to herein as a "spark pin" electrode. This probe has a metallic sheath which is approximately the same dimension as an ejector pin of an injection molding process. The ejector pin is isolated from the mold by an insulator sleeve, which may be a ceramic of Teflon ® material.

This serves as one of the electrodes which touches the moldable material while it is contained within a mold or is passing through a die. The other side of the clamping mold has a corresponding surface area which serves as a ground. This surface area is isolated from the rest of the mold. An identical electrode structure can be used here again for the ground electrode, with the insulator jacket encapsulated in a metallic sheath to ensure the mechanical consistency of the probe. In the spark pin electrode preferred embodiment, two spark pin electrodes are needed, one on each side of the molded material.

FIG. 8 illustrates another presently preferred embodiment useful for applying a voltage field in accordance with the present invention. This embodiment illustrates a probe which is referred to herein as an "electrode". The electrode in this Figure includes an ejector pin having a longitudinally-oriented hole passing therethrough. This creates a sleeve into which an insulated wire is inserted. In this embodiment, a preferred insulator is alumina. Instead of an insulator that is a ceramic, a non-ceramic insulator such as Teflon ® may be used.

In the electrode illustrated in FIG. 8, the voltage is applied between the injector pin's outside sheath and the insulated wire contained therein. In this preferred embodiment, one single probe is used with the two electrodes contained inside. One electrode is ground and the field is no longer across the thickness of the material molded but is generated between the inside wire and the outside metallic annulus.

It is evident from the foregoing that various modifications, which are apparent to those skilled in the art, can be made to the embodiments of this invention without departing from the spirit or scope thereof. Having thus described the invention, it is claimed as follows.

That which is claimed is:

1. A process for determining the actual temperature of a non-conductive moldable material contained within a mold or passing through a die at a given point in time, said process comprises:
    (a) shaping a non-conductive, moldable material, said moldable material either having dipoles or other charged particles therein, or being susceptible to the creation of dipoles or other charged particles therein when subjected to a polarization medium;
    (b) polarizing at least a portion of the moldable material while within the mold or while passing through the die, by subjecting the material to a polarization medium, wherein during the polarization step, the moldable material is subjected to said polarization medium until either at least some of the dipoles or other charges within the moldable material are oriented in the direction of the polarization medium, or until at least some of the dipoles or other charged particles are created thereby;
    (c) cooling the polarized, moldable treated material; and
    (d) analyzing the effect of polarizing the moldable material while said moldable material is within the mold or passing through the die by permitting an at least partial relaxation of the polarized dipoles or other charges within the polarized, moldable material,
    (i) wherein the relaxation results in the disorientation of, or decrease in, at least some of the polarized dipoles or other charges within the polarized, moldable material,
    (ii) wherein the disorientation of, or decrease in, the polarized dipoles or other charges within the polarized, moldable material generates a measurable electrical current,
    (iii) wherein the electrical current generated from the relaxation of polarized, moldable material is measured, and
    (iv) wherein the measured electrical current is correlated to the temperature at which the polarization was performed.

2. A process as recited in claim 1 wherein said non-conductive, moldable material is selected from the group consisting of filled composite materials, unfilled composite materials, and combinations thereof.

3. A process as recited in claim 1 wherein the non-conductive, moldable material is selected from the group consisting of thermoplastics, thermosets, wood in a pasty form, and blends thereof.

4. A process as recited in claim 1, wherein the non-conductive, moldable material is selected from the group consisting of polyethylene, polypropylene, nylons, PET, polystyrene, PMMA, polycarbonates, and blends thereof.

5. A process as recited in claim 1, wherein at least a portion of the polarizing medium is in the form of a voltage field.

6. A process as recited in claim 5, wherein the moldable material contained within the mold or passing through the die is electrically-treated by passing a current between two electrodes positioned apart from one another such that the current must flow through at least a portion of the moldable material.

7. A process as recited in claim 5, wherein at least a portion of the moldable material is electrically-treated by passing a current between two portions of a single probe electrically isolated from one another such that the current passes by at least a portion of the moldable material.

8. A process as recited in claim 5, wherein the voltage field is supplied by a dc voltage supply having an intensity ranging from between about 1 volt to about 1,200 volts.

9. A process as recited in claim 8, wherein the dc voltage supply has an intensity ranging from between about 1 volt to about 500 volts.

10. A process as recited in claim 5, wherein the voltage field is supplied by an ac voltage supply having a frequency ranging from between about 60 Hz to about 1 MHz.

11. A process as recited in claim 1, wherein at least a portion of the polarizing medium is at least one of the mediums selected from the group consisting of ultrasonic waves and magnetic perturbation.

12. A process as recited in claim 1, wherein the polarization medium is applied to the moldable material during at least a portion of step (c).

13. A process as recited in claim 12, wherein said polarization medium is applied to the moldable material throughout step (c).

14. A process as recited in claim 1, wherein the effect of polarizing the moldable material is analyzed by a thermal stimulated current-type device.

15. A process as recited in claim 1, wherein the current generated by the at least partial relaxation of the polarized, moldable material during step (d)(ii) ranges from between about $10^{-16}$ to about $10^{-9}$ amperes.

16. A process as recited in claim 1, wherein after step (d), steps (a) through (d) are repeated at least one additional time for a subsequent charge of the same non-conductive moldable material contained within the same mold or for a subsequent charge of the same non-conductive moldable material passing through the same die with the only change being the point in time during the molding process at which the moldable material is polarized.

17. A process as recited in claim 16, wherein a temperature profile is made for either the moldable material, the mold in which the moldable material is contained or the die through which the moldable material passes, said temperature profile identifies the actual temperature of the moldable material, the mold in which the moldable material is contained or the die through which the moldable material passes at any point in time during the molding process.

18. A process as recited in claim 1, wherein said non-conductive, moldable material comprises a polymeric material.

19. A process as recited in claim 1, wherein said non-conductive, moldable material comprises a rubber.

20. A process as recited in claim 1, wherein at least a portion of the polarizing medium comprises a mechanical perturbation.

* * * * *

UNITED STATES PATENT AND TRADEMARK OFFICE
CERTIFICATE OF CORRECTION

PATENT NO. : 5,326,393
DATED : July 5, 1994
INVENTOR(S) : Jean-Pierre Ibar

It is certified that error appears in the above-indentified patent and that said Letters Patent is hereby corrected as shown below:

Column 2, line 18, change "thermocouples couples" to --thermocouples--;
Column 3, line 11, change "after the theological" to --alter the theoretical--.

Signed and Sealed this

Eighteenth Day of October, 1994

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,326,393
DATED      : July 5, 1994
INVENTOR(S) : Jean-Pierre Ibar

It is certified that error appears in the above-indentified patent and that said Letters Patent is hereby corrected as shown below:

Column 3, line 11, change "alter teh theoretical" to --alter the rheological --.

Signed and Sealed this

Twenty-ninth Day of November, 1994

Attest:

BRUCE LEHMAN

Attesting Officer

Commissioner of Patents and Trademarks